March 22, 1927.

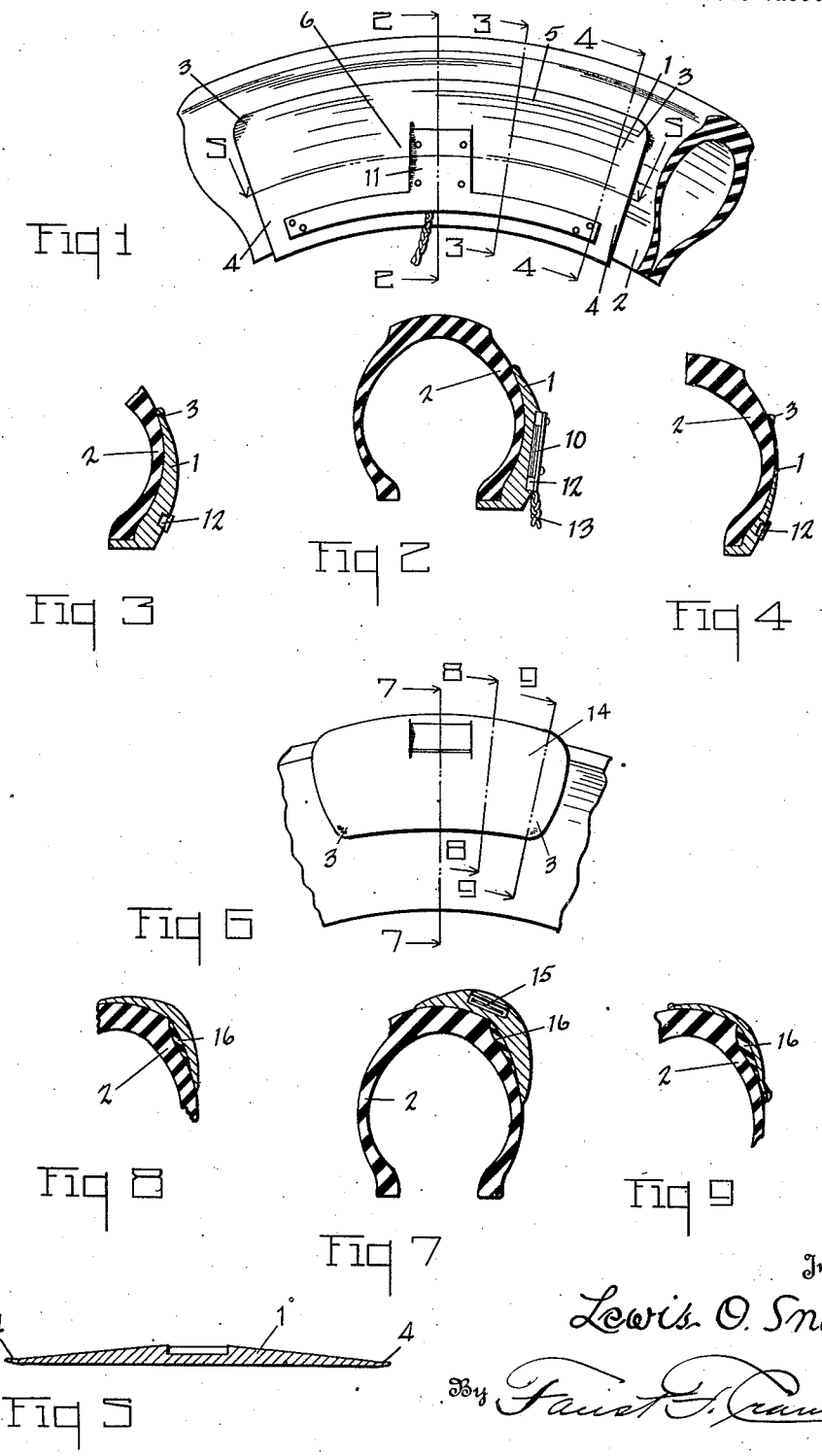

L. O. SNARE 1,621,958

VULCANIZER

Filed April 17, 1926   2 Sheets-Sheet 2

Inventor
Lewis O. Snare
By Faust F. Crampton
Attorney

Patented Mar. 22, 1927.

1,621,958

UNITED STATES PATENT OFFICE.

LEWIS O. SNARE, OF TOLEDO, OHIO.

VULCANIZER.

Application filed April 17, 1926. Serial No. 102,648.

My invention has for its object to provide an electric vulcanizer for efficient local vulcanization of rubber, such as, for vulcanizing rubber patches or parts, or automobile tires, or parts of articles containing rubber that will prevent local burning or over vulcanization and at the same time uniformly treat the rubber of the article or subject it to uniform change of heat from the point to which the vulcanization is to be performed outwardly. Structures containing the invention are each provided with an electrical heat unit that is located, preferably, in a central portion of a metallic shoe or form that conforms substantially to the shape of the tire or other article in the region of the point at which the vulcanization of the rubber is to be performed, such as, at the point where the patch is to be formed. The metallic shoe is also so formed that the head will be concentrated to a proper degree on the particular part of the article to be vulcanized and will be dissipated over the portion of the article in the region of the particular part to uniformly heat treat the whole region to maintain uniform flexibility or substantial uniform vulcanization in the vicinity of the particular part to be vulcanized or at least to produce a very slight and gradual change of vulcanization in the article in the region of the patch or other part to be vulcanized relative to the degree of vulcanization of the body portion of the article.

The invention may be contained in structures that partake of different forms and to illustrate a practical application of the invention, I have selected two or three structures containing the invention as examples of structures that embody the invention and shall describe them hereinafter. The structures selected are shown in the accompanying drawings.

Figure 10:
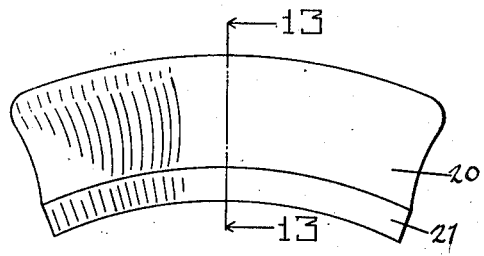
Figure 11:
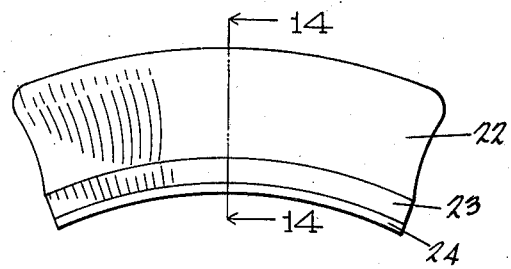
Figure 12:
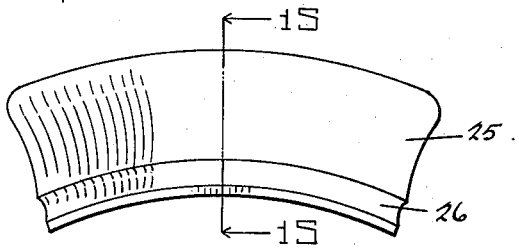
Figure 13:
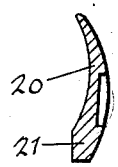
Figure 14:
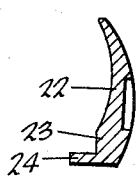
Figure 15:
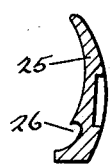

Figure 1 of the drawings is a side view of one of the forms containing the invention and is shaped for vulcanizing a patch that may be formed on the side of the tire. Fig. 2 is a view of a section taken on the plane of the line 2—2 indicated in Fig. 1. Fig. 3 is a view of a section taken on the plane of the line 3—3 indicated in Fig. 1. Fig. 4 is a view of a section taken on the plane of the line 4—4. Fig. 5 is a view of a section taken on the plane of the line 5—5 indicated in Fig. 1. Fig. 6 is a side view of another form which may be used for vulcanizing portions of the tread of a tire. Fig. 7 is a view of a section taken on the plane of the line 7—7 indicated in Fig. 5. Fig. 8 is a view of a section taken on the plane of the line 8—8 indicated in Fig. 6. Fig. 9 is a view of a section taken on the plane of the line 9—9 indicated in Fig. 6. Fig. 10 is a view of another form of vulcanizer. Fig. 11 is an inside view of a modified form of tire vulcanizer and Fig. 12 is an inside view of still another form of vulcanizer. Fig. 13 is a view of a section taken on the plane of the line 13—13 indicated in Fig. 10. Fig. 14 is a view of a section taken on the plane of the line 14—14 indicated in Fig. 11 and Fig. 15 is a view of a section taken on the plane of the line 15—15 indicated in Fig. 12.

The vulcanizing shoes illustrated in the drawings are formed of a heat conductive material and consequently are preferably formed of metal. I have further found that aluminum is best adapted for the purpose because of its high heat conductivity. The vulcanizer is made to conform substantially to the shape of the surface of the portion of the article where local vulcanization is to be produced and is made of a sufficient size to properly heat treat that portion of the article that is located in the vicinity or region of the particular part of the article that is to be locally vulcanized. As shown in the drawings, the vulcanizing shoe 1 has an inner or contact area that substantially conforms to the shape of that portion of the tire 2 that is to be vulcanized. In the form of construction shown in Figs. 1 to 5, inclusive, the shoe 1 is used for vulcanizing patches on the side wall of the tire while the form of construction shown in Figs. 6 to 9, inclusive, the shoe is used for vulcanizing patches that are to be formed on the tread portion of the tire. The shoes, however, are so formed that the corners 3 flare away from the side wall of the tire to prevent concentration of the heat at this point. Also if desired the edges, such as, the end edges 4 and the top edge 5 may also be flared away from the side wall, for the same purpose. The central part, such as at 6, is made relatively very thick while all of the edges are made thin and the vulcanizing shoe is tapered from the central thick portion towards its edges, which produces the desired spread of the heat over that region of the tire located in the vicinity of the patch, and yet concentrates to the proper degree the vulcanizing heat over the patch. This prevents local burning or over vulcanization particularly of that portion of the tire located juxtaposed to the patch and thus the patch maintains a uniform degree of flexibility which is exceedingly desirable in tires as well as other articles formed of or containing flexible rubber.

The heat unit which may be formed in any of the well known ways is mounted on the central portion of the vulcanizing shoes shown in the figures. If the shoes are made sufficiently thick in the central portion, the vulcanizing shoes may be recessed in the central portions and the heat units 10 may be located in the recesses. The heat unit may be secured in position by a suitable protective plate 11 that may be secured by screws to the outer surface of the vulcanizing shoe. In order that the bead may be properly vulcanized, the shoe may be slotted along the bead such as at 12 and the heat unit may be provided with extended parts that may be located in the slot 12. The heat unit may be connected with a source of supply of an electric current through the wires 13.

Substantially the same description is applicable to the construction shown in Figs. 6 to 9, inclusive, which is used for vulcanizing the tread portion of the tire where the heat unit 15 is located in the central thicker portion of the vulcanizing shoe. In order to make the tread to conform to the interior surface of the shoe, since it would require a large number of shoes to conform to the various forms of treads, a filler 16 may be used that is formed of rubber. In using the filler the tire is covered with soap stone dust on that portion of the tire that is covered by the shoe and which does not conform to the shape of the shoe. Covering the tire with the pulverant material enables the ready separation of the filler when the tire has been vulcanized in the manner well known in the art.

The forms of the shoe may be varied according to the beads that are commonly used on the tires as indicated in Figs. 10 to 15. The shoe 20 shown in Fig. 10 has a flat surface 21 in the region of the beaded area of the tire. The shoe 22 shown in Fig. 11 has also a flattened area 23 and an inwardly extending flanged area 24 to insure proper vulcanization of the bead of the tire. The shoe 25 shown in Fig. 11 is for vulcanizing an outwardly extending beaded portion. It is provided with a channel 26 that will conform to the exterior surface of the bead.

I claim:

1. In a vulcanizing shoe formed of heat conducting material and having a relative thick central portion and tapering toward the edges of the shoe, an electrical heat unit located at the central portion for heating the shoe.

2. In a vulcanizing shoe formed of aluminum and having a relative thick central portion and tapering toward the edges of the shoe, an electrical heat unit located at the central portion for heating the shoe.

3. In a vulcanizing shoe formed of heat conducting material and having a relative thick central portion and tapering toward the edges of the shoe and having flaring corners, an electrical heat unit located at the central portion for heating the shoe.

4. In a vulcanizing shoe formed of heat conducting material and having a relative thick central portion and tapering toward the edges of the shoe and having flaring edges, an electrical heat unit located at the central portion for heating the shoe.

5. In a vulcanizing shoe formed of heat conducting material and having a relative thick central portion and tapering toward the edges of the shoe and having flaring corners and edges, an electrical heat unit located at the central portion for heating the shoe.

In testimony whereof I have hereunto signed my name to this specification.

LEWIS O. SNARE.